May 12, 1970 G. A. KUPSKY 3,512,027
ENCAPSULATED OPTICAL SEMICONDUCTOR DEVICE
Filed Dec. 12, 1967 2 Sheets-Sheet 1
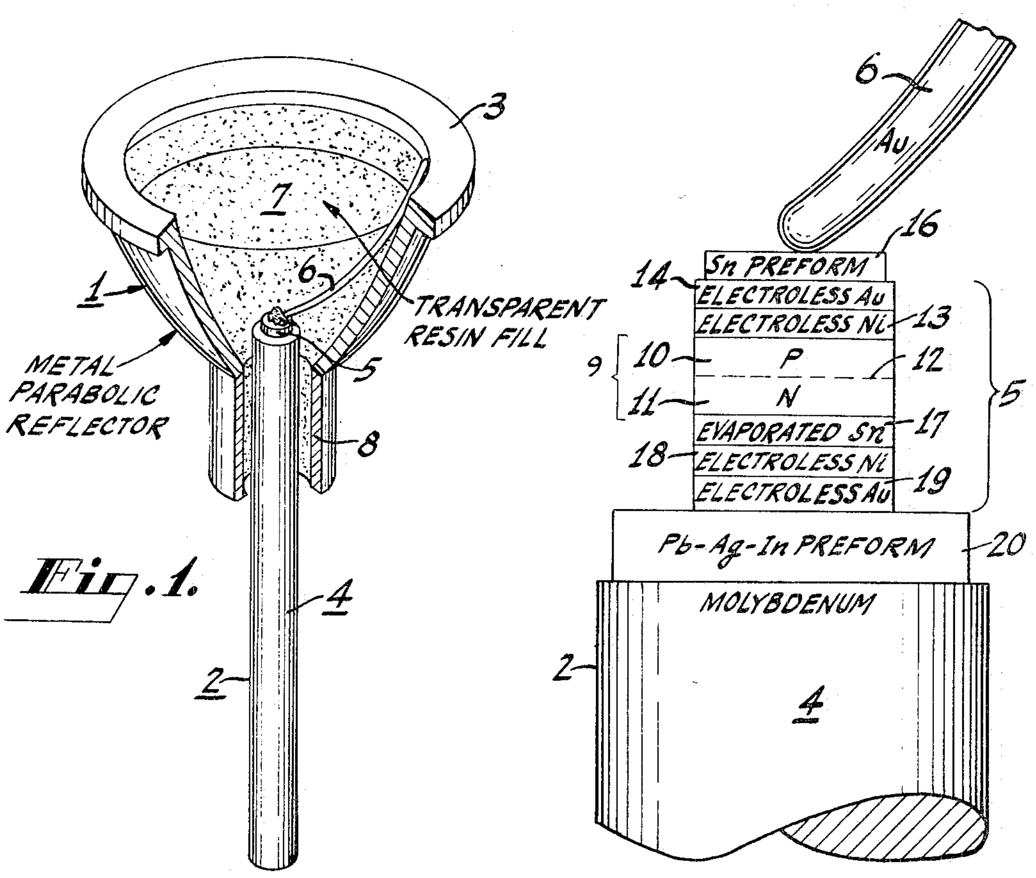
FIG. 1, FIG. 2
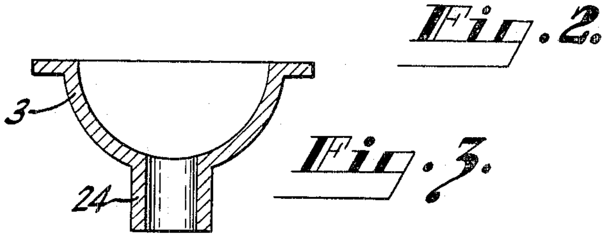
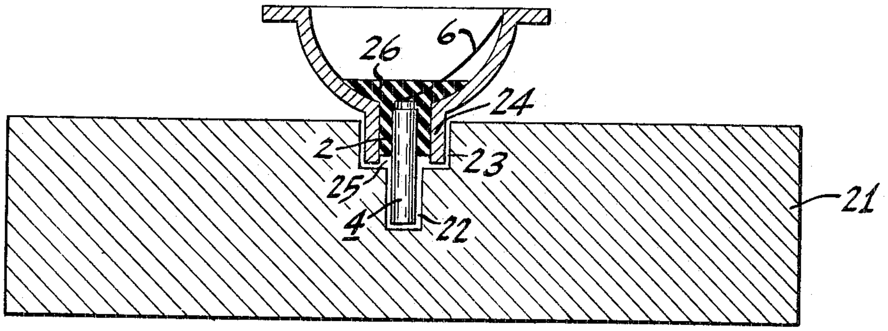
FIG. 4
Inventor:
GEORGE A. KUPSKY
BY [signature]
Attorney May 12, 1970 G. A. KUPSKY 3,512,027

ENCAPSULATED OPTICAL SEMICONDUCTOR DEVICE

Filed Dec. 12, 1967 2 Sheets-Sheet 2

Inventor:
GEORGE A. KUPSKY
BY [signature]
Attorney

3,512,027
ENCAPSULATED OPTICAL SEMICONDUCTOR DEVICE

George A. Kupsky, Milford, N.J., assignor to RCA Corporation, a corporation of Delaware
Filed Dec. 12, 1967, Ser. No. 689,955
Int. Cl. H01j 1/62, 63/04
U.S. Cl. 313—108 2 Claims

ABSTRACT OF THE DISCLOSURE

A light-emitting P-N junction diode in which the active semiconductor die is mounted on a metal stem. A paraboloidal reflector surrounds the semiconductor die. A transparent plastic fills the space within the reflector, encapsulates the semiconductor die, insulates the metal stem from the reflector, and provides a bond between the stem and reflector.

BACKGROUND OF THE INVENTION

This invention relates to the field of optical semiconductor devices and more particularly to an improved encapsulated optical device of relatively simple construction, and process for making the same.

It is well known that electroluminescence is exhibited in the vicinity of a P-N junction which is biased so as to inject charge carriers of one type into a region where the predominant charge carriers are of opposite type. Light is emitted in conjunction with the recombination of pairs of oppositely charged carriers.

In order to provide increased light intensity by collimating the radiation from the various parts of a light emitting P-N junction, it has been proposed to employ an integral light reflecting surface, preferably of paraboloidal shape with the active element situated at the focal point of the paraboloid.

The various attempts which have been made to provide commercially feasible optical semiconductor devices with integral reflectors are exemplified, e.g., by (i) U.S. Pat. Nos. 3,290,539 and (ii) 3,304,429, as well as (iii) U.S. patent application No. 529,019, filed Feb. 21, 1966 (now abandoned), and assigned to the assignee of the instant application, and (iv) an article by Roy and Yeh in vol. 7, No. 1 (June 1964) of the IBM Technical Disclosure Bulletin.

These heretofore known optical diodes with integral reflecting surfaces, however, require rather complex structures, and are difficult to fabricate utilizing commercially practicable techniques.

An object of the present invention is to provide an optical diode having an integral reflector and susceptible of fabrication by production methods.

Another object of the invention is to provide an encapsulated optical diode capable of being manufactured at relatively low cost.

SUMMARY OF THE INVENTION

The invention provides an optical semiconductor device comprising an active semiconductor element containing a P-N junction and situated on one end of a metal stem. The active element is bonded to the stem so that one of the semiconductor regions adjacent the junction is electrically connected to the stem. A terminal wire extends from the other region of the active element.

A generally paraboloidal light reflector is coaxial with and spaced from the stem such that the P-N junction of the active element is situated substantially at the focal point of he paraboloid.

A transparent substance within the paraboloid encapsulates the active element. An insulating adhesive layer is disposed between the light reflective layer and the metal stem.

The terminal lead is embedded in the transparent substance; according to the disclosed embodiments of the invention, the free end of the terminal lead may be either (i) brought out through the mass of transparent substance, or (ii) electrically bonded to the light reflective layer.

In the drawings:

FIG. 1 shows, in partially cut-away perspective view, an optical semiconductor device according to a preferred embodiment of the invention;

FIG. 2 shows a subassembly employed in fabricating the device of FIG. 1;

FIG. 3 shows a light reflector used in manufacturing the device of FIG. 1;

FIG. 4 shows the device of FIG. 1 at an intermediate stage of manufacture;

DETAILED DESCRIPTION

Figure 5:
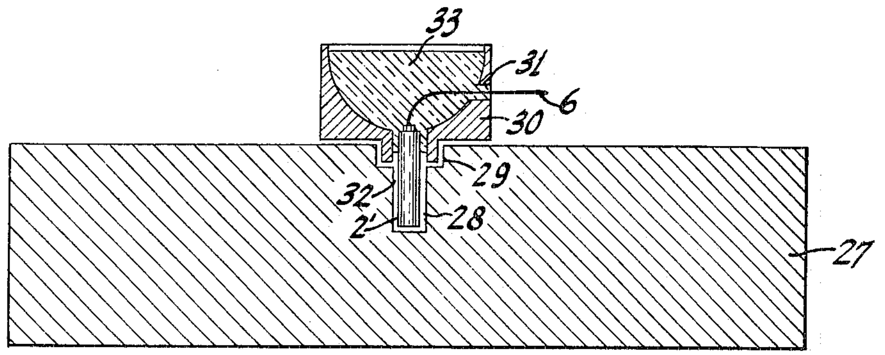
FIG. 5 shows an alternative embodiment of the invention at an intermediate stage of manufacture.

The optical device 1 of my invention consists of two piece parts of subassemblies 2 and 3, mechanically interconnected by a transparent material, as shown in FIG. 1.

The piece part 3 comprises a metal light reflector. This light reflector 3 may be either machined or stamped or manufactured by other suitable methods. However, for the purpose of minimizing the cost of fabrication, we prefer to employ a stamped reflector for this purpose.

The reflector 3 may comprise a solderable material, such as gold plated copper or brass, and may typically have a thickness on the order of 10 to 15 mils. Typically, the reflector may have a diameter on the order of 80 mils and an overall height on the same order. The reflector 3 contains a portion shaped in a form approximating a paraboloid of revolution and will therefore be hereafter referred to as a paraboloidal reflector.

The subassembly 2 comprises a molybdenum stem 4 on the upper end of which is situated a semiconductor element 5. The semiconductor element 5 includes a die of semiconductor material which contains a P-N junction with one of the regions adjacent the junction being electrically connected to the stem 4. As shown, the P-N junction intersects the surface of the die in a peripheral line spaced above the upper end of the stem 4.

A terminal lead 6 electrically connects the other region of the die (adjacent the P-N junction) to the metal paraboloidal reflector 3.

A transparent substance 7 is disposed within and substantially fills the reflector 3, while at the same time encapsulating the semiconductor die 5 and providing electrical insulation and mechanical bonding between the lower portion 8 of the reflector 3 and the stem 4.

The transparent substance 7 has a refractive index greater than that of air but less than that of the semiconductor material, so that any light emitted from the P-N junction is efficiently coupled to the external surroundings.

The reflector 3 is disposed coaxially wtih and spaced apart from the stem 4, in such a manner that the above mentioned peripheral line on the surface of the semiconductor die is situated substantially at the focal point of the paraboloid.

Briefly, the optical diode of FIG. 1 is assembled by first fabricating the reflector 3 and the subassembly 2, then placing the reflector and subassembly in a suitable jig in properly spaced apart and coaxially aligned fashion, and finally filling the space between the reflector 3 and the subassembly 2 with a substance capable of conversion to a homogeneous transparent solid adherent to both the stem 4 and the reflector 3.

The detailed construction of the subassembly 2, as seen in FIG. 2, involves the provision of a semiconductor die 9 having adjacent P type and N type regions 10 and 11 respectively, with a P-N junction 12 therebetween. The die 9 preferably comprises a relatively wide band gap material such as gallium arsenide or gallium phosphide so that when the P-N junction 12 is forward biased, light is emitted therefrom, particularly along the peripheral line where the junction 12 extends to the surface of the die 9.

The upper surface, or P type region 10, has an electrolessly deposited nickel layer 13 disposed thereon for the purpose of providing ohmic contact to the region 10. A solderable electrolessly deposited gold layer 14 is disposed on the nickel layer 13. A gold terminal lead 6 having a diameter on the order of 4 mils is soldered to the electroless gold layer 14 by means of a tin solder preform 16 and a zinc chloride flux (not shown) interposed between the terminal lead 6 and gold layer 14.

An evaporated tin layer 17 provides ohmic contact to the N type region 11. An electrolessly deposited nickel layer 18 is disposed on the tin layer 17. A solderable electrolessly deposited gold layer 19 overlies the nickel layer 18. The upper end of the molybdenum stem 4 is soldered to the gold layer 19 by means of a lead-silver-indium preform 20 to provide an ohmic joint of good electrical and thermal conductivity between the semiconductor die 9 and the molybdenum stem 4.

The completed subassembly 2 is now assembled to the reflector 3 (shown in FIG. 3) by means of a transparent filler material, as shown in FIG. 4.

To facilitate the assembly process, a stainless steel jig 21 is employed. The jig 21 has (i) an elongated hole 22 which receives the lower end of the metal stem 4 of the subassembly 2 and (ii) another hole 23, communicating with the hole 22, which receives the generally cylindrical lower part 24 of the reflector 3.

Before the subassembly 2 and reflector 3 are placed in the jig 21, the lower hole 22 is partially filled with a silicone grease 25, such as that known as Dow Corning DC–4. When the lower end of the metal stem 4 is placed in the hole 22, the level of the silicone grease 25 is raised so that the grease extends partially into the hole 23. The purpose of the grease is to prevent the transparent filler material subsequently employed from covering the lower end of the metal stem 4, since this lower end is employed as an electrical terminal and heat sink for the completed device 1.

The generally cylindrical portion 24 of the reflector 3 is then partially filled with a hardenable substance which is convertible to a homogeneous transparent solid. We prefer to employ a clear epoxy resin such as Stycast 1264, manufactured by Emerson and Cuming, Inc., Canton, Mass. This particular resin, when cured, is highly transmissive to light having a wavelength on the order of 0.9 micron, in the near infrared range. This is approximately the wavelength of the light radiated from the P-N junction 12 of the active element 5 when the semiconductor material employed is gallium arsenide.

The epoxy resin is poured into the space between the subassembly 2 and the generally cylindrical lower portion 24 of the reflector 3 to provide an insulating adhesive region 26. The resin is then cured at a temperature on the order of 80° C. for a time on the order of 4 hours, so that the region 26 becomes hardened and serves to bond the subassembly 2 to the reflector 3 while at the same time providing electrical insulation between these piece parts.

The epoxy resin 26 partially fills the reflector 3 to such a level that it encapsulates the semiconductor die 5 and rigidly secures the adjacent portion of the terminal lead 6.

The next step is to electrically bond (preferably by soldering) the free end of the terminal lead 6 to the inner surface of the reflector 3, so that the reflector surface acts as an electrical terminal of the completed device.

After the free end of the terminal lead 6 has been soldered to the reflector 3, additional Stycast 1264 epoxy resin is added to substantially fill the reflector 3. This additional resin is then cured at 80° C. for 4 hours, after which time the resultant structure is removed from the jig 21. Any of the silicone grease 25 which adheres to the device is then removed, and the remaining open portion of the generally cylindrical lower end 24 of the reflector 3 is back filled with additional epoxy resin, which is subsequently cured at the aforementioned 80° C. temperature for a 4 hour period.

Rather than employ a stamped metal piece part for the reflector 3, this reflector can take the form of a metal layer which is deposited on the outer surface of the epoxy resin filler material, after the filler has been cast into a generally paraboloid shape and subsequently cured.

A stainless steel jig 27, shown in FIG. 5, is employed in the process according to this alternative embodiment of the invention. The jig 27 is provided with an elongated hole 28 which receives a subassembly 2′, which resembles the subassembly 2 shown in FIG. 2. For this embodiment, however, we prefer to employ copper for the metal stem 4, with a small molybdenum disk at the upper end of the stem to provide thermal expansion coefficient matching to the semiconductor die 9. The subassembly 2′ is otherwise identical to the subassembly 2 shown in FIG. 2.

The jig 27 also contains an upper hole 29, coaxial with the hole 28, into which is indexed a stainless steel mold 30. The mold 30 has a small hole 31 in one side thereof, through which the terminal lead 6 extends.

As before, the hole 28 is initially partially filled with a Dow Corning DC–4 silicone grease.

After the subassembly 2′ has been placed in the hole 28, so that the terminal lead 6 extends through the hole 31, the mold is filled with a mass 33 of Stycast 1264 transparent epoxy resin. The resin is cured at 80° C. for four hours, after which time the resultant structure is removed from the mold 31.

Figure 6:
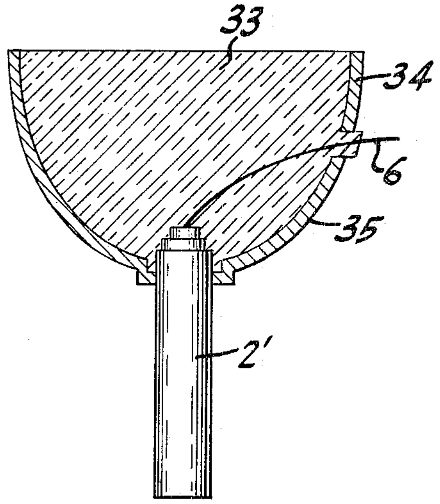
FIG. 6 shows a completed optical device according to the alternative embodiment of the invention.

Any adherent silicone grease is then removed from the resultant structure. A thin layer of a light reflective material such as silver is then evaporated or otherwise deposited onto the paraboloidal outer surface of the hardened epoxy resin mass 33, to provide a light reflective layer 34. The completed device 35 is shown in FIG. 6.

While my invention is intended primarily for use in conjunction with a light emitting active semiconductor element, it may also be useful where it is desired to collect and direct light onto a light sensitive active semiconductor element employed as a photodetector.

I claim:

1. An optical semiconductor device, comprising:

a metal stem having an upper end;

an active semiconductor element mounted on said upper end;

said element having adjacent P type and N type regions with a P-N junction therebetween, one of said regions being electrically connected to said upper end, said junction extending to the surface of said element along a peripheral line spaced from said upper end;

a generally paraboloidal light reflector coaxial with and spaced from the upper end of said stem, said reflector surrounding said active element in such a manner that the peripheral junction line of said active element is situated substantially at the focal point of said reflector;

a single transparent insulating substance disposed between said reflector and said element and between said reflector and said stem, said substance encapsulating said element and adhesively bonding said reflector to said stem; and a terminal lead embedded in said substance and having one end electrically connected to the other region of said active element.

2. A device according to claim 1, wherein the other end of said terminal lead is electrically connected to said reflector, and said reflector is electrically conductive.

References Cited

UNITED STATES PATENTS

| | | | |
|---|---|---|---|
| 3,322,992 | 5/1967 | Parker et al. | 313—113 X |
| 2,669,663 | 2/1964 | Pantchechnikoff | 250—211 |
| 2,898,474 | 8/1959 | Rutz | 250—211 |
| 3,281,606 | 10/1966 | Lueck | 250—239 |
| 3,354,316 | 11/1967 | Deverall | 250—217 |

OTHER REFERENCES

Roy and Yeh, Gallium Arsenide Light-Emitting Diode, IBM Technical Bulletin, vol. 7, No. 1, June 1964, p. 61.

Sunners, Mount for Light Emitting Diode, IBM Technical Bulletin, vol. 8, No. 7, December 1965, p. 1015.

Parabola Increases Infrared Intensity, Electronics Magazine, Oct. 17, 1966, p. 170.

Shah, High-Efficiency Electroluminescent Diodes, IBM Technical Bulletin, vol. 9, No. 7, December 1966, p. 947.

JAMES W. LAWRENCE, Primary Examiner

D. O'REILLY, Assistant Examiner

U.S. Cl. X.R.

313—113; 250—217